(12) United States Patent  
Haas et al.

(10) Patent No.: US 7,028,155 B2  
(45) Date of Patent: Apr. 11, 2006

(54) MASTER-SLAVE DATA MANAGEMENT SYSTEM AND METHOD

(75) Inventors: William Robert Haas, Fort Collins, CO (US); Kirk Steven Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/421,299

(22) Filed: Apr. 22, 2003

(65) Prior Publication Data

US 2004/0215906 A1    Oct. 28, 2004

(51) Int. Cl.  
*G06F 12/16* (2006.01)

(52) U.S. Cl. .................... 711/162; 711/115

(58) Field of Classification Search ........... 711/115, 711/162; 707/204; 714/6  
See application file for complete search history.

(56) References Cited

U.S. PATENT DOCUMENTS

| | | | |
|---|---|---|---|
| 6,070,222 A | 5/2000 | Farmwald et al. | |
| 6,532,551 B1 * | 3/2003 | Kamei et al. | 714/13 |
| 6,588,662 B1 * | 7/2003 | Hu | 235/451 |
| 6,842,405 B1 * | 1/2005 | D'Agosto, III | 369/29.02 |
| 2002/0040440 A1 | 4/2002 | Hashimoto et al. | |
| 2002/0049826 A1 * | 4/2002 | Ariga | 709/216 |
| 2002/0051375 A1 | 5/2002 | Kim et al. | |
| 2002/0184579 A1 | 12/2002 | Alvarez et al. | |
| 2004/0103172 A1 * | 5/2004 | Chen et al. | 709/221 |

FOREIGN PATENT DOCUMENTS

| | | |
|---|---|---|
| EP | 0518367 B1 | 8/1995 |
| EP | 0806728 A2 | 11/1997 |
| EP | 1152428 A2 | 11/2001 |
| EP | 1339212 A2 | 8/2003 |

OTHER PUBLICATIONS

Darrin Woods, Raid's Ins & Outs, Article 1, Network Computing, Oct. 1, 2001, pp. 1-4.

* cited by examiner

*Primary Examiner*—Hiep T. Nguyen

(57) ABSTRACT

A master-slave data management system includes a bus in communication with a processor, a first data path separate from the bus providing the processor with communication to a first memory, and a second data path separate from the bus providing the processor with communication to a second memory. The processor is configured to form a redundant array of independent memories by establishing the first memory as a master memory and subsequently writing to the second memory to make the second memory a slave memory.

12 Claims, 7 Drawing Sheets

Memory A
Memory B

US 7,028,155 B2

MASTER-SLAVE DATA MANAGEMENT SYSTEM AND METHOD

BACKGROUND OF THE INVENTION

1. Field of the Invention

This invention relates to electronic systems, and more particularly to master-slave data management systems and methods.

2. Description of the Related Art

Electronic devices manufactured for capturing, creating, storing, manipulating or transferring digital music, sound, images, movies or other encoded data are more prevalent with the advent of inexpensive semiconductor processing and increased consumer demand. Products such as portable MP3 (Moving Picture Experts Group Layer 3 Standard) players, digital cameras and digital voice recorders continue to gain popularity. The general trend for each of these commercial devices is to provide for greater data storage capability at reduced cost.

Unfortunately, the trend for providing greater memory in these devices is accompanied with the trend in increased cost and time wasted when such large amount of data is lost from a memory device failure. Many portable electronic devices lack redundancy in design; such lack fails to help the consumer recover from a memory device failure. Even for devices that have the ability to provide back-up data, time spent restoring previously backed-up data is tedious and troublesome for the average consumer. Also, should a purchaser desire to upgrade a memory device in their product, a time-consuming process ensues with the purchaser often using a PC to back up data for restoration onto the replacement memory device.

Some manufacturers have attempted to solve these problems through increased data throughput to PCs for backup and file transfer. Unfortunately, the single memories in these devices often fail prior to back-up due to physical shock such as dropping, or normal wear and tear. Another solution utilizes two banks of DIMMS (dual in-line memory modules). In this solution, data is written to a first bank at the same time a second bank is reading data for the next write. If one bank fails, the data is written from the bank that mirrors the data to replace the failed memory. Another approach includes a RAID (redundant array of industry-standard DIMMS) memory solution using five memory controllers to control five memory banks of industry-standard DIMMS. The memory controllers split the data into four blocks and write the four blocks to the four memory banks. A RAID processor calculates parity information which is stored on the fifth memory bank. If any one of the memory banks requires replacement, the data can be recovered from the remaining four memory banks. Each of these solutions provides for data redundancy, but the solutions do not provide mechanisms for consumer-friendly memory repair and upgrade in portable devices.

SUMMARY OF THE INVENTION

Therefore, there still exists a need for a portable electronic device system that provides for data redundancy without the use of a PC, and that may provide for easy memory upgrade capability without the use of a PC in the transfer. One embodiment of the present invention is described by a system including a bus in communication with a processor, a first data path separate from the bus providing the processor with communication to a first memory, and a second data path separate from the bus providing the processor with communication to a second memory, wherein the processor is configured to form a redundant array of independent memories by establishing the first memory as a master memory and subsequently writing to the second memory to make the second memory a slave memory.

Also, an embodiment of the invention is described as including a controller module in communication with a master memory and a slave memory through first and second independent data paths, respectively, and an application module in communication with the controller module. The application module sends application data to the controller module and the controller module sends the application data first to the master memory and then sends the application data to the slave memory.

A method is described for distinguishing between existing and new memories by receiving a first current memory identification ("ID") representing a first memory, receiving a second current memory ID representing a second memory, and comparing each of the first and second current memory IDs to previously saved first and second memory IDs.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION OF THE INVENTION

The invention provides a system for managing and storing data in a memory storage module for use with consumer applications such as MP3 players, digital recorders, or any other electronic device enabling the capture, creating, storing, manipulating or transferring of digital music, sounds, images, movies or other encoded data. Through the use of a plurality of memories, a redundant array of independent memory is available for a controller module and for at least one consumer application. One of the memories is assigned to be a master memory by comparing memory capacities between memories, or through a determination of which memory is new to the system (a "new memory") and which memory remains installed (an "existing memory"). The memory that the new memory replaced is removed from the system ("discarded memory"). By writing to the master memory first and to the slave memory second, a system is created to reduce the effects of data loss through damage to a memory device. An embodiment of the invention also provides for memory upgrades without the use of a personal computer (PC) through management of the write process within the device itself.

Figure 1:
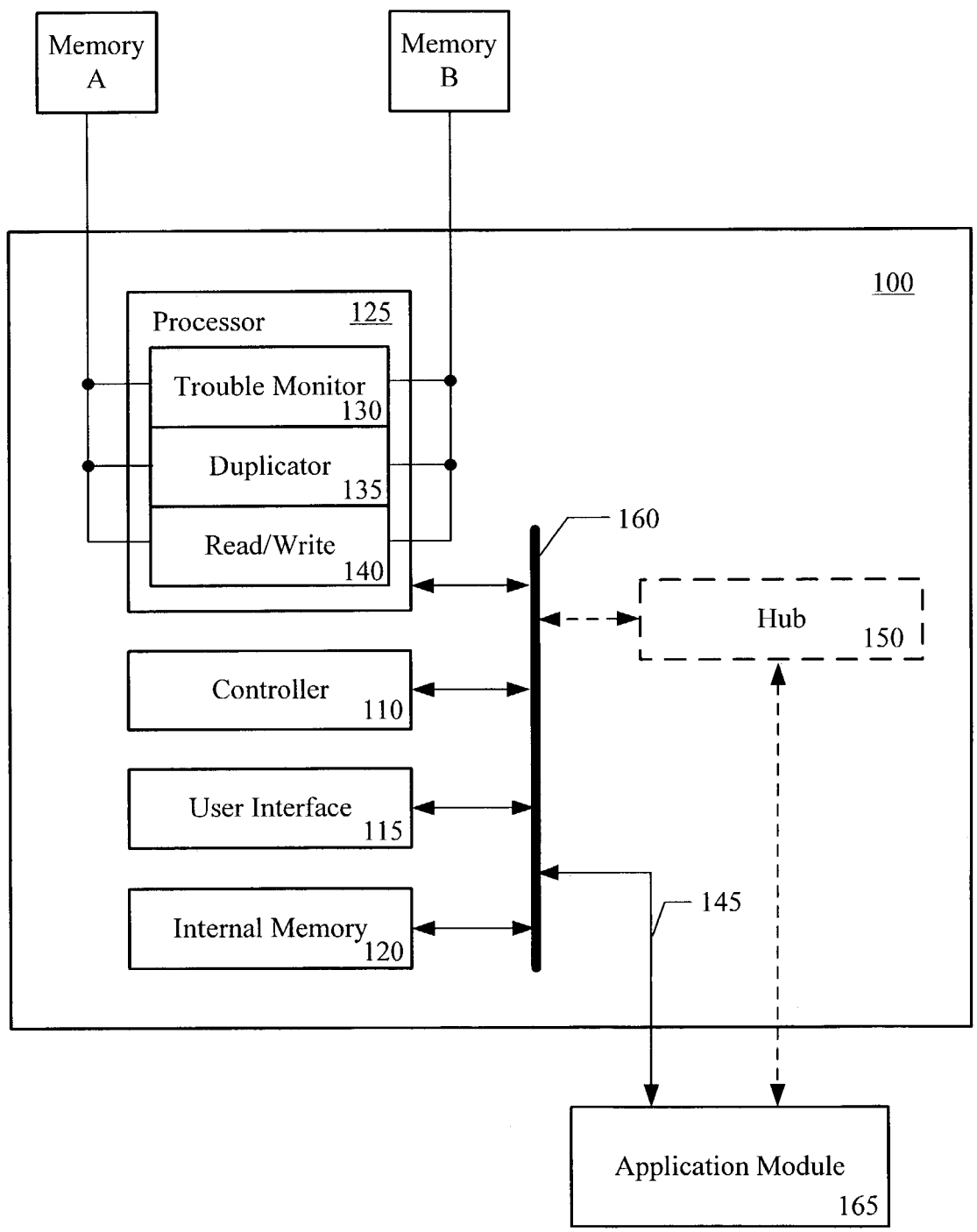
FIG. 1 is a block diagram of an embodiment of a system of redundant memory showing the redundant memory in direct connection with a processor.

Several embodiments are described in the context of two memories, memories A and B, but may be extended to describe the use of more than two memories. FIG. 1 illustrates an implementation scheme for a controller module 100. The controller module 100 is shown in communication with memories A and B and application module 165. The controller module 100 includes a bus 100 in communication with a controller 110, a user interface 115, an internal memory 120, and a processor 125. The various components manage the application data received through the data path 145 for the controller module 100 and manage data from and between memories A and B. The processor 125 and controller 110 may be integrated into a single device. Similarly, internal memory 120 may be integrated onto a single chip with either the processor 125 or controller 110, or both.

The processor 125 provides several functions including a trouble monitor 130, a duplicator 135 and a read/write circuit 140. The trouble monitor 130 and processor 125 detect whether memories A and B connected to processor 125 are operating correctly and notify the user of problems through the user interface 115. Duplicator 135 enables duplication of application data from memory A to memory B without the use of other external devices such as a PC. The duplicator 135 also communicates through the bus 160 to the user interface 115 to provide information to a user regarding duplication efforts. The read/write circuit 140 communicates with external applications such as an application module 165, and governs the read/write of data to master and slave memories such as memory A or memory B. In an example, the functions (130, 135, 140) may be implemented in firmware or by using a software controlled general purpose DSP (Digital Signal Processor). Also, a third memory or set of memories may be coupled to the processor 125 at the controller module 100. The bus 160 is illustrated with electrically conductive paths between the processor 125, controller 110, user interface 115, and internal memory 120. An optical bus may also be used, as well as any manner of signal conduit, medium, or signaling method.

Memories A and B are shown in direct communication with processor 125. Memories A and B could also communicate with processor 125 through bus 160, utilizing a data protocol having an addressing scheme managed by the processor 125 and controller 110.

In an alternative embodiment, a hub 150 is provided in the controller module 100 to enable use of the controller module 100 with user applications. The data path 145 for the controller module 100 extending from the bus 145 would be replaced by the hub 150 in communication with the bus 160. A wireless scheme utilizing Bluetooth™ wireless technology or other wireless scheme could also be provided for a data path substitute between the controller module 100, memories A and B and an application module 165. Also, controller module 100 and application module 165 are described as "modules" for convenience. They may be integrated into a single unit for purposes of the described embodiment.

Figure 2:
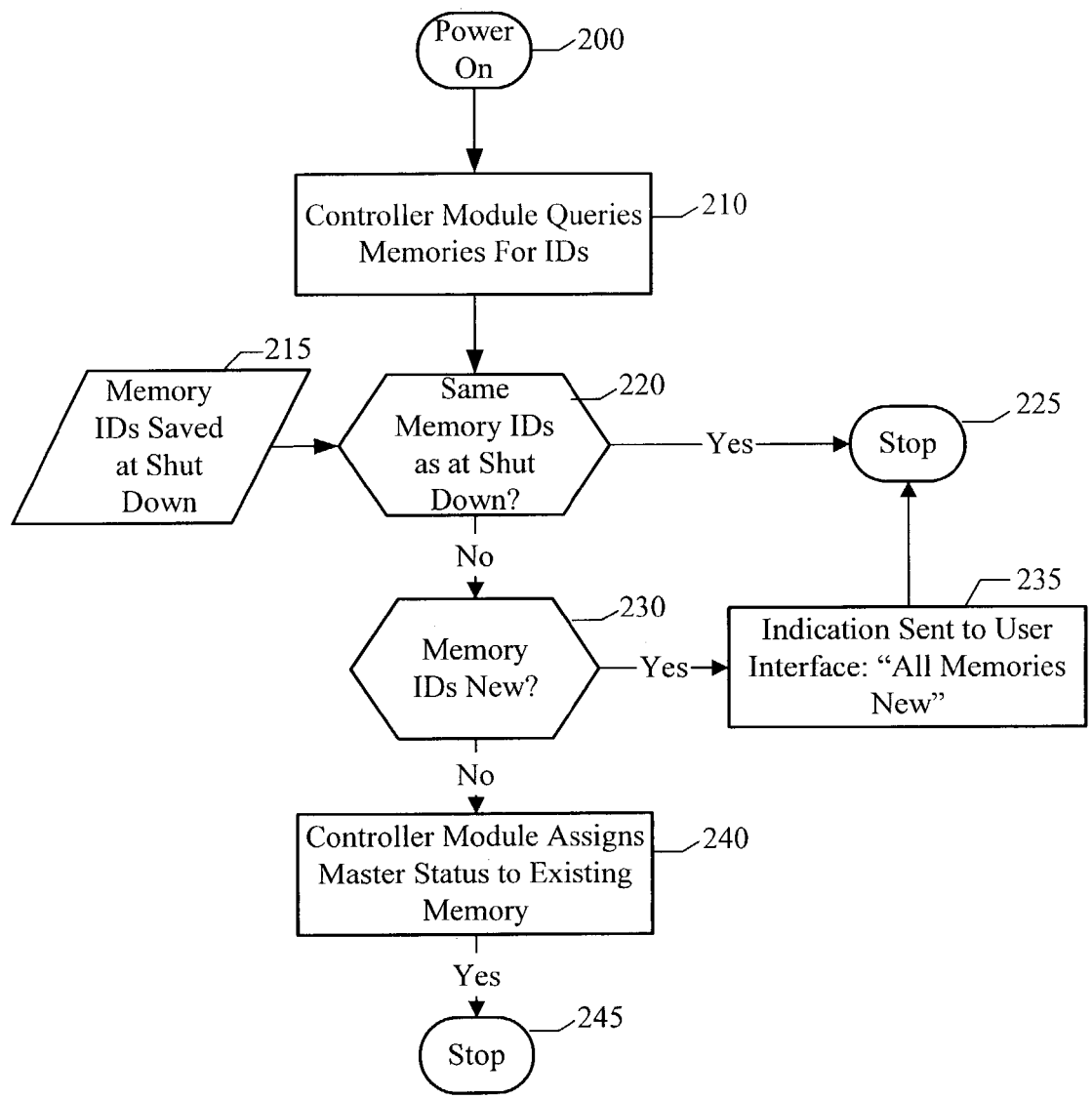
FIG. 2 is an embodiment a flow diagram for assigning master status to a memory using memory IDs in the system shown in FIG. 1.

Referring to FIG. 2, an embodiment of an implementation scheme is illustrated for assigning one of memory A and memory B to be a master memory. The memory that is written to first is referred to as the master. For example, if memory A is assigned master status, then data arriving from the application module 165 through the controller module 100 will be written first to memory A, and then to memory B. The method begins with power on of the controller module 100 (block 200). The controller module 100 uses processor 125 to query memories A and B for their IDs (block 210). The processor 125 retrieves the IDs previously saved at the last shut down (block 215) from the internal memory 120 and compares them to the ID numbers retrieved from the present inquiry (block 220). If the previously saved-and-retrieved IDs match, the process ends (block 225). If both IDs retrieved from the memories are different from the previously saved IDs (blocks 215, 230), an indication is sent by the processor 125 to the user interface 115 that both memory A and B are new (block 235), and the process ends. If only one of the memory IDs are new, then the controller module 100 assigns master status to the existing memory (block 240) using the processor 125, and the process ends (block 245).

The memory IDs can be serial numbers. Also, although the memory device IDs are saved during the shutdown process for the controller module 100, they may be saved at any time prior to a shut down to provide for an eventual comparison at a controller module 100 power on. The indication sent to the user that both memories are new (block 235) may be replaced with any suitable indication that the process of determining a master memory is as yet undetermined. Also, if preferred by the user, such an indication may not be given at all, but rather used internally by the controller module 100.

Figure 3:
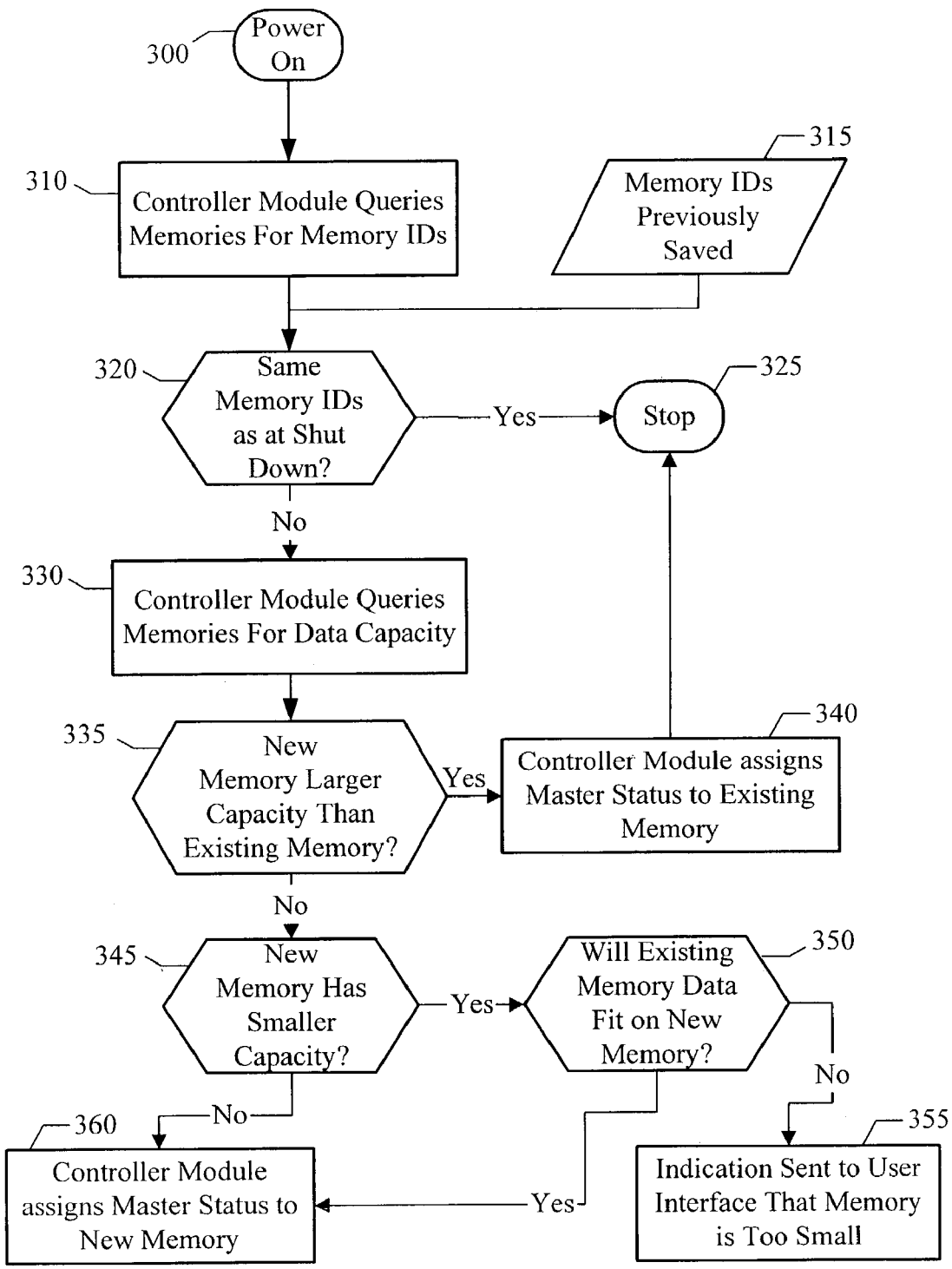
FIG. 3 is an embodiment of a flow diagram for assigning master status to a memory using application data capacity in the system shown in FIG. 1.

Referring to FIG. 3, a scheme is illustrated for assigning master status to either memory A or B using the memory capacity of each of the memories. The controller module 100 is powered on (block 300) and queries memories A and B for their IDs (block 310) using processor 125. The retrieved IDs are compared to the memory IDs previously stored at the previous controller module 100 shutdown (blocks 315, 320). If the retrieved IDs and previously stored IDs are the same, the process is stopped (block 325). The controller module assumes neither memory A nor B are new. If any of the retrieved IDs are not the same as the IDs saved at shut down, the controller module 100 queries each of memories A and B for their memory device data capacity (block 330). Memory returning a new ID is considered to be the new memory.

If the new memory has a larger data capacity than the existing memory, the controller module 100 assigns master status to the existing memory (blocks 335, 340) and the process is stopped (block 325). The existing memory replicates its existing data to the new memory. The process described above ensures that subsequent data writes will result in application data redundancy in both memories because data is written first to the smaller of the memories (the master memory), and then to the larger memory (slave memory). Once the smallest memory device is full (the master memory), further writes are prevented.

If the new memory has a smaller data capacity than the existing memory (block 345), the processor 125 compares the size of the existing application data (if any) on the existing memory with the capacity of the new memory (block 350). If the existing application data on the existing memory will not fit on the new memory, the user is provided with an indication that the new memory is too small to provide redundancy between the memories (block 355). If the new memory has the same or greater capacity as the existing memory (block 345), or if the data on the existing memory will fit on the new memory if the new memory is smaller (block 350), then the controller module 100 assigns master memory status to the new memory (block 360).

Rather than the controller module 100 querying the memories for their data capacities (block 330), the processor 125 may be provided with a look-up table of memory application data capacities, based on ID designation or some similar identification. Also, if a user attempts to replace an existing memory with a new memory having less application data capacity than the pre-existing application data on the existing memory (block 350), the user may be provided with indication or warning of the potential loss of data and insufficient capacity in the new memory for redundancy.

Figure 4:
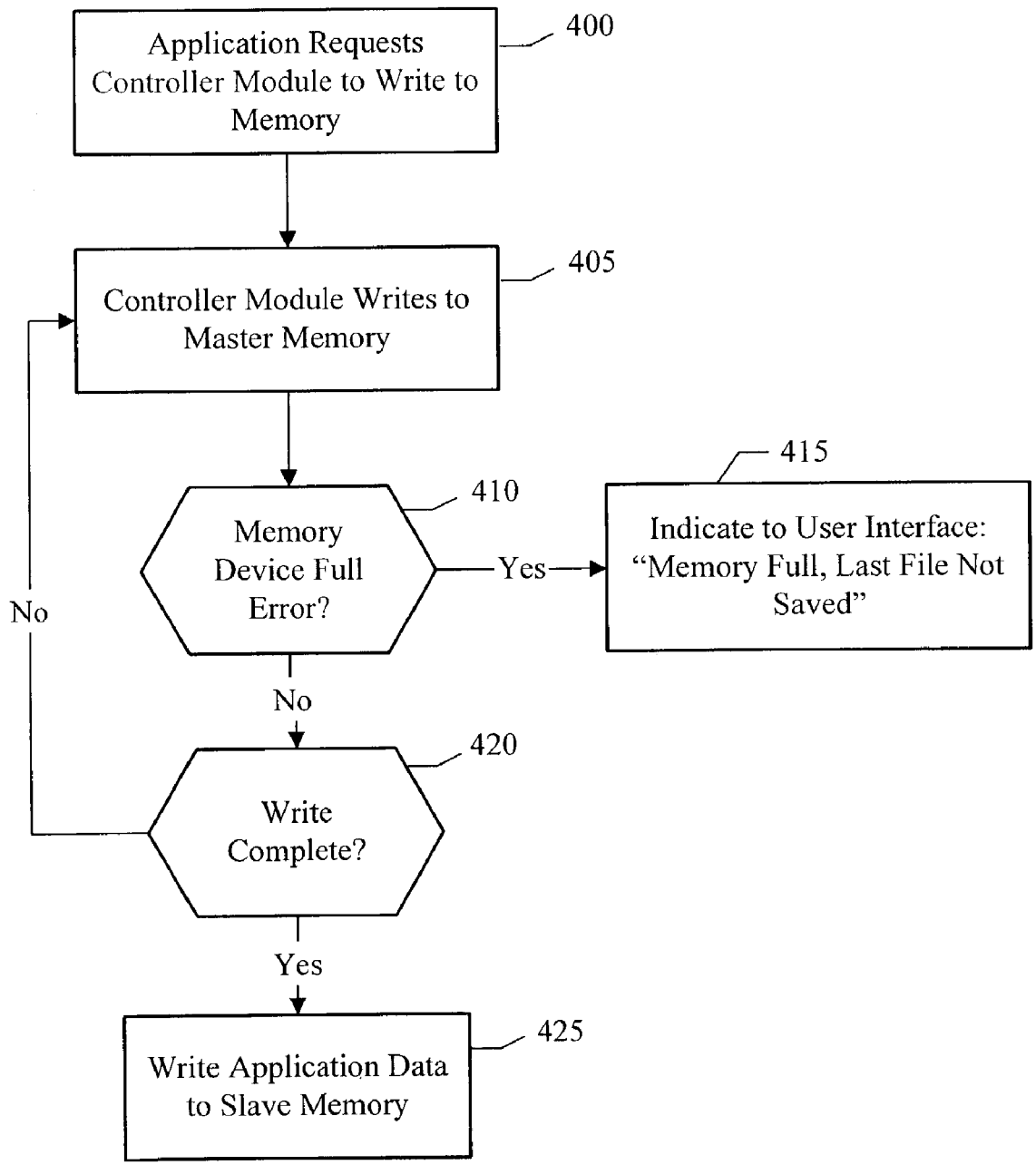
FIG. 4 is a flow diagram illustrating an embodiment of a method for using master status to manage data flow within the system shown in FIG. 1.

FIG. 4 illustrates an implementation scheme for using the master status of a memory to manage the data flow to memories A and B. The application module 165 requests the controller module 100 to write application data to memories A and B (block 400). The controller module 100 writes first to the master memory using the read/write circuit 140 in processor 125 (block 405). The trouble monitor 130 monitors the write for a memory full error (block 410). If the trouble monitor 130 indicates a write error, indicating the master memory is full, the user interface 115 is provided with a message to the user that the memory is full and the last file was not saved (block 415). If the write to the master memory is complete (block 420), the processor 125 continues to write the application data to the slave memory to provide for data redundancy (block 425). The master memory is either an existing memory or a new memory, with the processor 125 ensuring that data redundancy is maintained between the master and slave memories.

Rather than the controller module 100 receiving a write request from a particular application such as the application module 165, the controller module 100 may request application data from the application module 165. In such an implementation, the controller module 100 may then receive the application data to provide to the master memory (block 420).

Figure 5:
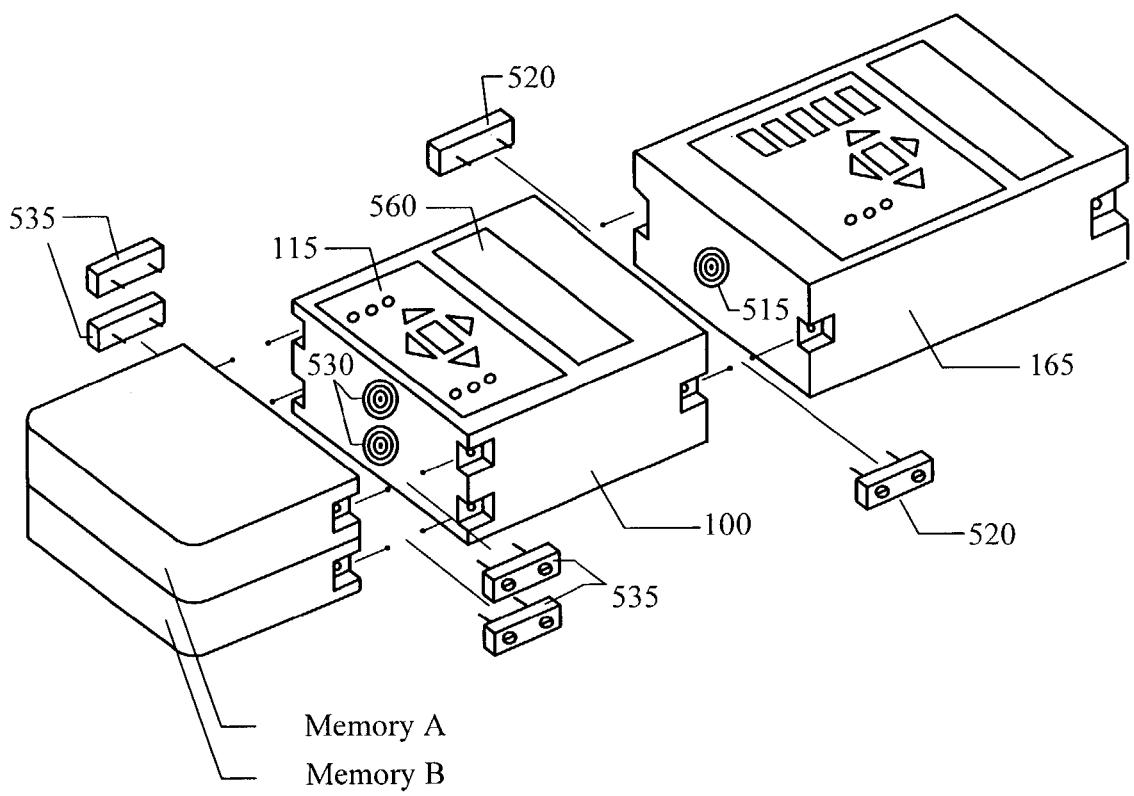
FIGS. 5, 6, and 7 are exploded, perspective views illustrating three different systems of redundant memory utilized in a memory storage at different locations in a portable electronic device.
Figure 6:
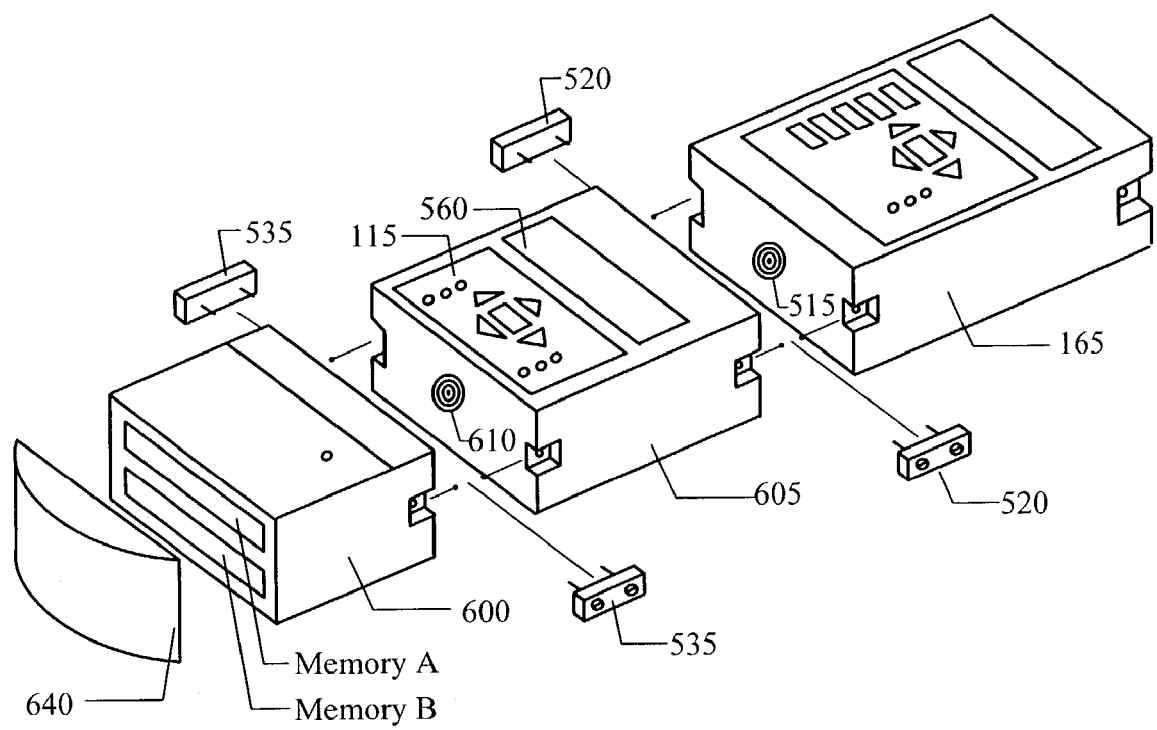
Figure 7:
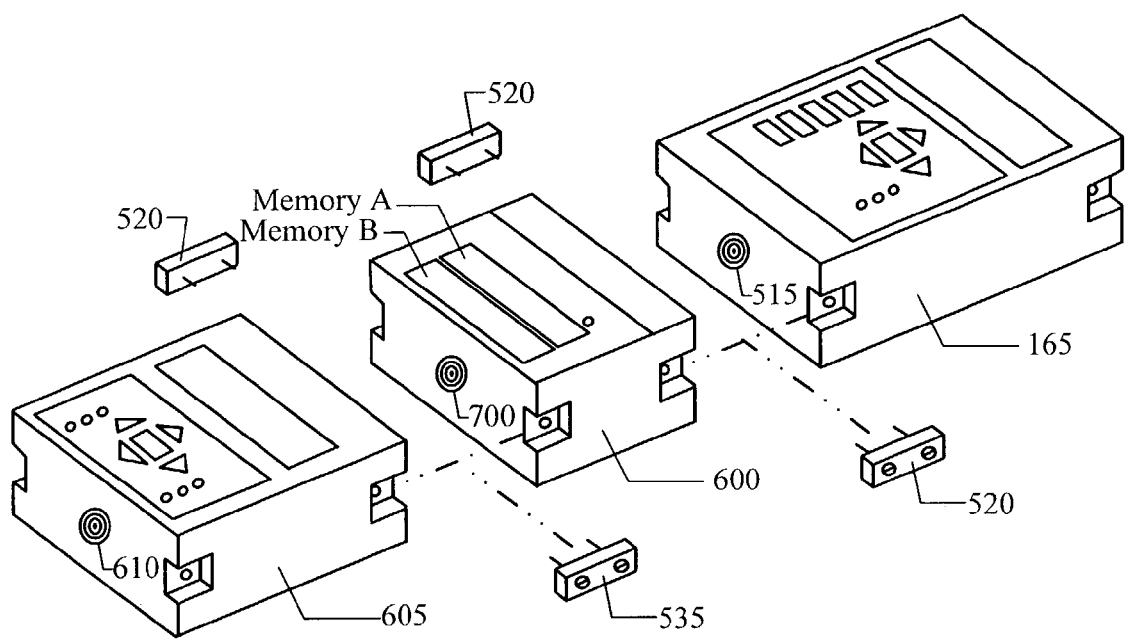

The above described embodiments and implementations are implemented in consumer electronic products such as those shown in FIGS. 5, 6, and 7. In FIG. 5, a controller module 100 is shown aligned for mechanical and electrical connection with application module 165 through electrical connector 515 and mechanical connectors 520. The controller module 100 manages the application data sent from the application module 165 to the memories A and B.

The application module 165 in communication with the controller module 100 may be any portable electronic consumer application such as a video/still image player or reviewer, a PDA (electronic personal data assistant), or a digital still or video camera. In an alternative embodiment, the application module 165 may be connected in turn to additional application modules (not shown) through an electrical and mechanical connector similar to electrical connector 515 and mechanical connectors 520. In such a case, the controller module 100 may distinguish between the different application modules utilizing a data addressing scheme.

Memories A and B are shown aligned for electrical connection with the controller module 100 through electrical connectors 530 and mechanical connectors 535. In an example, the memories may be rotated and reattached with respect to the controller module 100 through the use of the electrical connectors 530 as described above.

The physical shape of memories A and B, the controller module 100 and application module 165 are illustrated as rectangular for convenience. Alternatively, they may be stacked in different configurations. For example, and not by way of limitation, the devices may be stacked end to end to form a cylindrical shape, a square-like shape or some other desirable configuration. In such cases, the electrical connectors (515, 530) and mechanical connectors (520, 535) between the memories A and B, controller module 100, and application module 165 modules may be suitably modified.

Controller module 100 is shown having a user interface 115 and display 560. The user interface 155 comprises a keypad. In alternative implementations, the user interface 155 may be a microphone for speech recognition, a pressure sensitive touch screen using thin film transistors (TFT), or some similar device or combination of devices for inputting information (not shown). The display 560 is used to provide information to the user of the controller module 100 regarding application data transfer, memory device activities, and data retrieval. Alternatively, the display 560 may be incorporated into the user interface 115 utilizing a TFT screen or some similar device, allowing for both display and receipt of information.

The embodiments shown in FIGS. 1–4 may also be implemented as shown in FIG. 6. FIG. 6 shows memory A and B seated in a memory storage module 600 to facilitate acceptance of standardized form factor memories. In this example, memories A, B are each microdisk drives inserted into the memory storage 600. Alternatively, any manner of small form factor memories may be utilized in memory storage module 600, including a smartmedia card, memory stick, multimedia card or a miniature card format. Although memory A and memory B are inserted in one end of the memory storage module 600, they may be inserted on different sides of memory storage 600. For example, the memories may be inserted on a top side or bottom side rather than on the end. The memory storage module 600 connects to the controller module 605 through electrical connectors 610 on the controller module 100 and memory storage module 600 (memory storage module 600 side not shown). The memories may be left exposed at their ends, or memory storage cover 640 covers slots for memory A and B to protect them from damage. Alternatively, protection may be provided in a different mechanical configuration such as a pair of individually hinged or otherwise engaging covers for receiving memories, or memories A and B may individually disengage from memory storage module 600 from the exterior positions locating memory A and memory B.

Referring to FIG. 7, the controller module 605, application module 165 and memory storage module 600 are shown in a different configuration with respect to each other. Namely, the memory storage module 600 is connected between the application module 165 and controller module 605 using the electrical connectors (515, 130) and mechanical connectors (120, 135) (labels in FIG. 2). Also, in this configuration, access to memory A and memory B is from the top of memory storage module 600 rather than from an end.

We claim:

1. A master-slave data management system, comprising:
   a bus in communication with a processor;
   a first data path separate from the bus providing the processor with communication to a first memory; and
   a second data path separate from the bus providing the processor with communication to a second memory;
   wherein the processor is configured to compare memory capacities of said first and second memories to establish the first memory as a master memory and subsequently writing to the second memory to make the second memory a slave memory.

2. The system of claim 1, wherein the processor further comprises:
   a trouble monitor; and
   a read/write circuit;

the trouble monitor monitoring the read/write circuit to check for a memory device full indication from the master memory.

3. The system of claim 1, further comprising:

a hub in communication with the bus to provide application data to the processor.

4. A modular master-slave memory system, comprising:

a controller module in communication with a master memory and a slave memory through first and second independent data paths, respectively; and an application module in communication with the controller module;

wherein the application module sends application data to the controller module and the controller module sends the application data first to the master memory and then sends the application data to the slave memory.

5. The system of claim 4, wherein said controller module is programmed to check the memory capacity of said master and slave memories.

6. The system of claim 4, further comprising:

a memory module in communication with the controller module to house said master memory and said slave memory.

7. The system of claim 4, further comprising:

a user interface on the controller module.

8. The system of claim 7, wherein said controller module is programmed to, in response to said master memory having a smaller memory capacity than said slave memory, send a warning to said user interface that said master memory is too small.

9. The system of claim 5, wherein the controller module is programmed to, in response to said slave memory having a smaller memory capacity than said master memory, reassign memory designations so that the memory with the smallest memory capacity is the master memory.

10. A method for distinguishing between existing and new memories, comprising:

receiving a first current memory ID representing a first memory;

receiving a second current memory ID representing a second memory;

comparing each of the first and second current memory IDs to previously saved respective first and second memory IDs to determine which current memory ID represents an existing memory and which represents a new memory.

11. The method of claim 10, further comprising:

assigning an existing memory to be a master memory.

12. The method of claim 10, further comprising:

comparing the application data capacity of an existing memory to the application data capacity of a new memory; and assigning a memory with the smallest application data capacity to be a master memory.

* * * * *